(12) United States Patent
Aggarwal (10) Patent No.: US 6,970,884 B2
(45) Date of Patent: Nov. 29, 2005

(54) METHODS AND APPARATUS FOR USER-CENTERED SIMILARITY LEARNING

(75) Inventor: Charu C. Aggarwal, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 09/929,202

(22) Filed: Aug. 14, 2001

(65) Prior Publication Data

US 2003/0037015 A1 Feb. 20, 2003

(51) Int. Cl.$^7$ ............................................. G06F 17/30
(52) U.S. Cl. ........................ 707/103 Y; 707/6; 707/101
(58) Field of Search ................................ 707/2–5, 100

(56) References Cited

U.S. PATENT DOCUMENTS

| | | | | |
|---|---|---|---|---|
| 5,517,606 | A | * | 5/1996 | Matheny et al. ............. 715/810 |
| 5,764,975 | A | * | 6/1998 | Taniguchi et al. ............. 707/6 |
| 5,838,965 | A | * | 11/1998 | Kavanagh et al. ...... 707/103 R |
| 6,212,526 | B1 | * | 4/2001 | Chaudhuri et al. .......... 707/102 |
| 6,611,825 | B1 | * | 8/2003 | Billheimer et al. ............ 706/45 |
| 6,633,882 | B1 | * | 10/2003 | Shanmugasundaram et al. . 707/101 |

OTHER PUBLICATIONS

A. Hinneburg et al., "What is the nearest neighbor in High Dimensional Space?," VLDB Conference, 2000.

C.C. Aggarwal, "Re-designing distance functions and distance based applications for high dimensional data," ACM SIGMOD Record, Mar. 2001.

C.C. Aggarwal et al., "Reversing the dimensionality curse for similarity indexing in high dimensional space," ACM SIGKDD Conference, 2001.

J. Gehrke et al., "BOAT: Optimistic Decision Tree Construction," ACM SIGMOD Conference Proceedings, pp. 169-180, 1999.

J. Gehrke et al., "RainForest: A Framework for Fast Decision Tree Construction of Large Data Sets," VLDB Conference Proceedings, 1998.

R. Rastogi et al., "PUBLIC: A Decision Tree Classifier that Integrates Building and Pruning," VLDB Conference, 1998.

J. Shafer et al., "SPRINT: A scalable Parallel Classifier for Data Mining," VLDB Conference, 1996.

M. Mehta et al., "SLIQ: A Fast Scalable Classifier for Data Mining," EDBT Conference, 1996.

* cited by examiner

*Primary Examiner*—Greta Robinson
*Assistant Examiner*—Cheryl Lewis
(74) *Attorney, Agent, or Firm*—Rafael Perez-Pineiro; Ryan, Mason & Lewis, LLP (57) ABSTRACT

Techniques are provided for incorporating human or user interaction in accordance with the design and/or performance of data mining applications such as similarity determination and classification. Such user-centered techniques permit the mining of interesting characteristics of data in a data or feature space. For example, such interesting characteristics that may be determined in accordance with the user-centered mining techniques of the invention may include a determination of similarity among different data objects, as well the determination of individual class labels. These techniques allow effective data mining applications to be performed in accordance with high dimensional data.

15 Claims, 5 Drawing Sheets

METHODS AND APPARATUS FOR USER-CENTERED SIMILARITY LEARNING

FIELD OF THE INVENTION

The field of the present invention relates to data mining techniques and, more particularly, to techniques for incorporating human interaction in an effective way so as to design similarity functions and perform class supervision of data.

BACKGROUND OF THE INVENTION

The design of data mining applications has received much attention in recent years. Examples of such applications include similarity determination and classification. In the context of data mining, it is assumed that we are dealing with a data set containing N objects in a dimensionality of d. Thus, in this data space, each object X can be represented by the d coordinates (x(1), . . . x(d)). These d coordinates are also referred to as the features in the data. This is also referred to as the feature space which may reveal interesting characteristics of the data.

The effective design of distance functions used in similarity determination has been viewed as an important task in many data mining applications. The concept of similarity has been widely discussed in the data mining literature. A significant amount of research has been applied to similarity techniques such as, for example, those discussed in the literature: A. Hinneburg et al., "What is the nearest neighbor in High Dimensional Space?," VLDB Conference, 2000; C. C. Aggarwal, "Re-designing distance functions and distance based applications for high dimensional data," ACM SIGMOD Record, March 2001; and C. C. Aggarwal et al., "Reversing the dimensionality curse for similarity indexing in high dimensional space," ACM SIGKDD Conference, 2001, the disclosures of which are incorporated by reference herein.

A different but related problem in data mining is the prediction of particular class labels from the feature attributes. In this problem, there is a set of features, and a special variable called the class variable. The class variable typically draws its value out of a discrete set of classes C(1), . . . C(k). A test instance is defined to be a data example for which only the feature variables are known, but the class variable is unknown. Training data is used in order to construct a model which relates the features in the training data to the class variable. This model can then be used in order to predict the class behavior of individual test instances, also referred to as class labeling. The problem of classification has been widely studied in the literature, e.g., J. Gehrke et al., "BOAT: Optimistic Decision Tree Construction," ACM SIGMOD Conference Proceedings, pp. 169–180, 1999; J. Gehrke et al., "RainForest: A Framework for Fast Decision Tree Construction of Large Data Sets," VLDB Conference Proceedings, 1998; R. Rastogi et al., "PUBLIC: A Decision Tree Classifier that Integrates Building and Pruning," VLDB Conference, 1998; J. Shafer et al., "SPRINT: A Scalable Parallel Classifier for Data Mining," VLDB Conference, 1996; and M. Mehta et al., "SLIQ: A Fast Scalable Classifier for Data Mining," EDBT Conference, 1996, the disclosures of which are incorporated by reference herein.

However, as sophisticated and, in some cases, complex as these similarity and classification techniques may be, these conventional automated techniques lack benefits that may be derived from human interaction during their design and application stages. Therefore, techniques are needed that effectively employ human interaction in order to design and/or perform data mining applications such as similarity determination and classification.

SUMMARY OF THE INVENTION

The present invention provides techniques for incorporating human or user interaction in accordance with the design and/or performance of data mining applications such as similarity determination and classification. Such user-centered techniques permit the mining of interesting characteristics of data in a data or feature space. For example, such interesting characteristics that may be determined in accordance with the user-centered mining techniques of the invention may include a determination of similarity among different data objects, as well the determination of individual class labels. These techniques allow effective data mining applications to be performed in accordance with high dimensional data.

In accordance with a first aspect of the present invention, a computer-based technique of computing a similarity function from a data set of objects comprises the following steps/operations. First, a training set of objects is obtained. The user may preferably provide such training data. Next, the user is presented with one or more subsets of objects based on the training set of objects, wherein each subset comprises at least two objects of the data set. Preferably, the subset is a pair of objects from the data set. The user then provides feedback regarding similarity between the one or more subsets of objects. One or more sets of feature variables are defined based on features in the one or more subsets of objects. Next, one or more class variables are created in accordance with the user-provided feedback. Lastly, a similarity function or model is constructed which relates the one or more sets of feature variables to the one or more class variables.

Thus, advantageously, similarity between objects is represented as some function or algorithm determined by the attributes of the objects. The similarity model is then effectively estimated from the data set and user reactions.

In accordance with a second aspect of the present invention, a computer-based technique of classifying a test instance in accordance with a data set comprises the following steps. First, a test instance is obtained. The user may preferably provide such test instance. Next, the user is presented with at least one projection representing a distribution of the data set. The user then isolates a portion of the data presented in the at least one projection based on a relationship between the test instance and the data presented in the at least one projection. For instance, the user may isolate a subset of the data in the projection which the user determines to be most closely related to the test instance. Next, the behavior of the isolated portion of data is determined. Then, a class is determined for the test instance based on the isolated portion of data, when the user makes a decision to do so based on the determined behavior of the isolated portion of data. Alternatively, when the user makes a decision not to have a class determined for the test instance based on the isolated portion of data, other portions of the data set or a subset of the isolated portion of the data may be considered.

Further, in a preferred embodiment, the user is presented with two or more projections respectively representing different distributions of the data set such that the user may select one of the projections to be used when isolating a portion of data whose behavior is to be considered.

Thus, advantageously, such a class labeling methodology according to the invention provides a technique of decision path construction, in which the user is provided with the exploratory ability to construct a sequence of hierarchically chosen decision predicates. This technique provides a clear understanding of the classification characteristics of a given test instance. At a given node on the decision path, the user is provided with a visual or textual representation of the data in a small number of sub-spaces. This can be used in order to explore particular branches, backtrack or zoom-in into particular sub-space-specific data localities which are highly indicative of the behavior of that test instance. This process continues until the user is able to construct a path with successive zoom-ins which is sufficiently indicative of a particular class. The process of zooming-in is done with the use of visual aids, and can isolate data localities of arbitrary shapes in a given sub-space.

It is to be appreciated that the classification techniques of the present invention are more powerful than any of the conventional classification methods, since the invention uses a combination of computational power and human intuition so as to maximize user understanding of the classification without sacrificing discriminatory power. The result is a technique which, in most cases, can classify a test instance with a small amount of user exploration.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
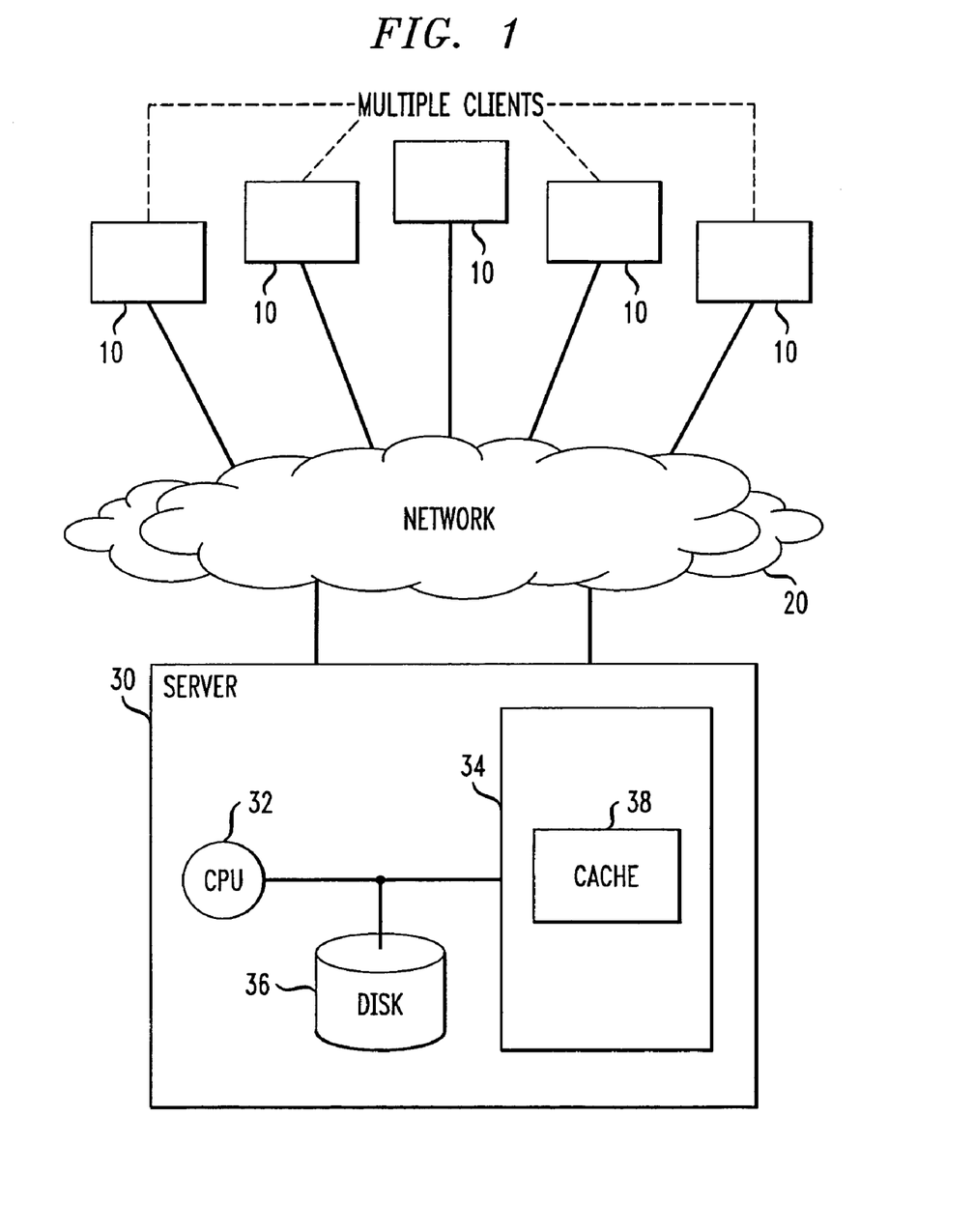
FIG. 1 is a block diagram illustrating a hardware implementation suitable for employing user interactive data mining methodologies according to an embodiment of the present invention.

FIG. 1 is a block diagram illustrating a hardware implementation suitable for employing human or user interactive data mining methodologies according to an embodiment of the present invention. It should be understood, however, that the invention is not limited to use with any particular system architecture. The invention is instead more generally applicable to any data processing system or network in which it is desirable to incorporate user interaction in a data mining process in order to substantially improve the process. For example, while a client/server environment is used to illustrate the methodologies of the invention, the invention may be implemented on a single computer system locally accessed by one or more users.

As illustrated, an exemplary system comprises client devices 10 coupled, via a large network 20, to a server 30. The server 30 may comprise a central processing unit (CPU) 32, coupled to a main memory 34 and a disk 36. The main memory 34 may also comprise a cache 38 to speed up computations. It is assumed that multiple clients 10 can interact with the server 30 over the large network 20. It is to be appreciated that the network 20 may be a public information network such as, for example, the Internet or the World Wide Web, however, the clients and server may alternatively be connected via a private network, a local area network, or some other suitable network.

It is assumed that the server 30 contains a large set of data which is used for data mining in response to client queries. A query to the server may be specified at one of the client devices 10, and then responded to using one or more of the methodologies of the present invention as implemented on the server 30. Computations are performed by the CPU 32. It is assumed that a user interface is available at the client device 10, so that the user may effectively interact with the system in accordance with the invention. The data on which the data mining system is run preferably resides on the server disk 36. This data is used for the purposes of similarity function design and class supervision, as will be explained in detail below. Computations are performed at the server end, and the results are returned to and presented (e.g., displayed) to the client. However, it is to be understood that some operations or sub-steps of the methodologies described herein may be performed at a client device which, itself, includes its own processor, memory and input/output devices (e.g., display, mouse, keyboard, etc.). It is to be understood that such a flexible architecture, as is illustrated in FIG. 1, allows multiple clients to access the data at the same time.

In one preferred embodiment, computer software components or programs including instructions or code for performing the methodologies of the invention, as described herein, may be stored in one or more of the memory devices described above with respect to the server (and/or client device) and, when ready to be utilized, loaded in part or in whole and executed by the CPU (and/or other processor).

Figure 2:
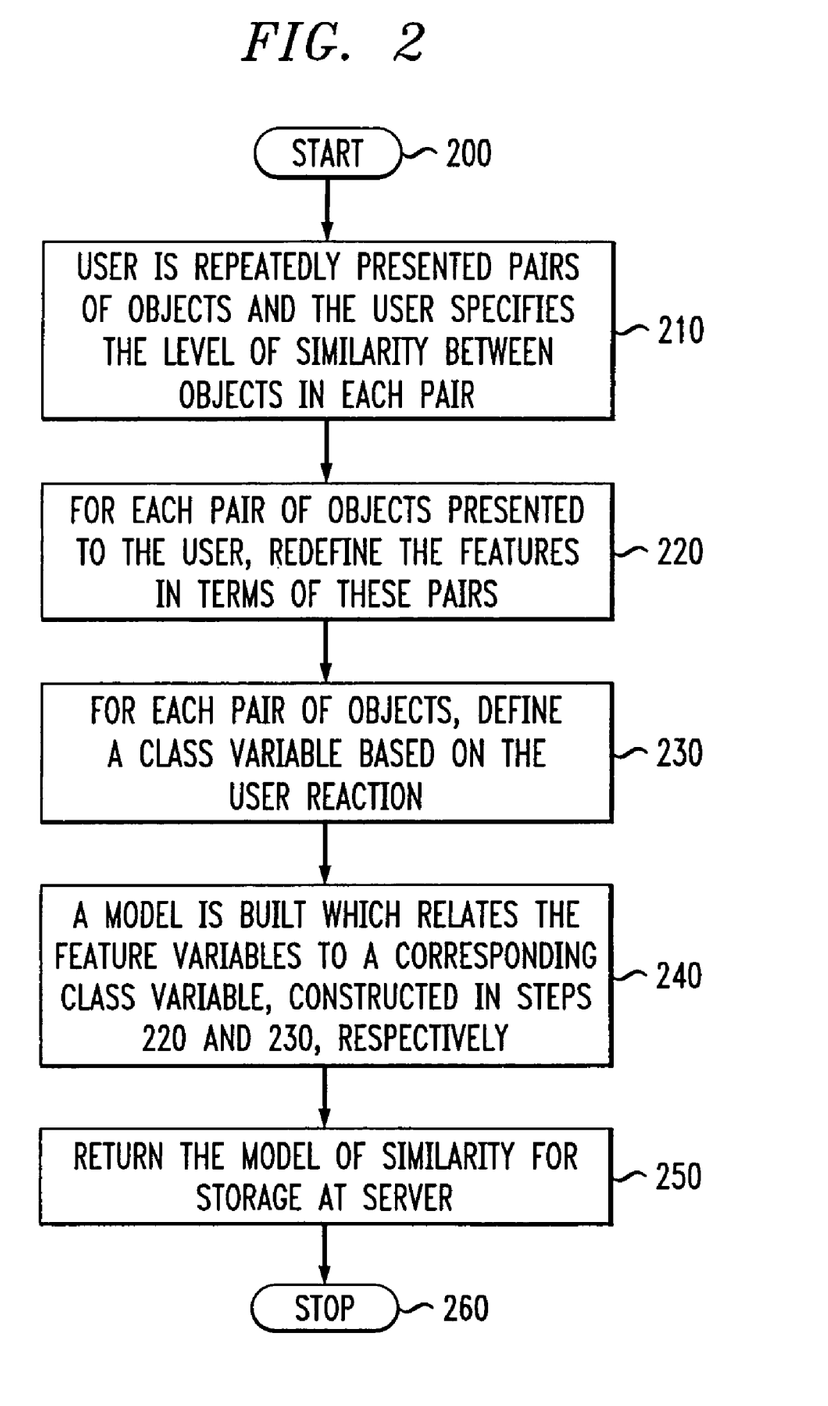
FIG. 2 is a flow diagram illustrating an overall process for determination of a similarity function in conjunction with user interaction according to an embodiment of the present invention.

FIG. 2 is a flow diagram illustrating an overall process for determination of a similarity function in conjunction with user interaction according to an embodiment of the present invention. More specifically, FIG. 2 is a description of a user interactive process which is used to determine similarity between pairs of objects in the feature space of the data set on the server, so as to generate a similarity function that may be subsequently used to automatically determine the similarity between two or more objects provided in an input query. It is to be understood that an "object," as referred to herein, may be one or more items of data, e.g., an object may represent one or more data records. We assume that each object is represented by a set of attributes (or dimensions) in the feature space. Thus, the similarity function designed in accordance with the user interactive process of FIG. 2 may be subsequently used to automatically determine the similarity between a pair of data records specified in an input query provided by a client.

The similarity function design process begins at block 200. As input to the process, the user (in accordance with a graphical or some other suitable interface at a client device) provides a set of data examples, e.g., sample data records. This input data set is referred to as training data since it is used to generate an estimated model for finding similarity between pairs of objects in a subsequent similarity query. The data examples may include examples of data records that the user considers to be similar, as well as data records that the user considers to be dissimilar.

The server receives the set of data examples via the network 20. In response, in step 210, the server repeatedly presents (again, in accordance with the client device interface) the user with pairs of objects from the overall data set associated with the server. That is, each pair comprises a pair of objects which are stored in the data set maintained at the server. The server uses the data examples provided by the user to determine the pairs of objects to be sent to the user. That is, by receiving the data examples provided by the user, the server is initially taught what the user considers to be similar objects and what the user considers not to be similar objects. Thus, the server sends pairs to the user based on this example information.

In response to the provision of object pairs to the user, still in step 210, the user then specifies the level of similarity between the objects in each pair. This specification by the user may be based on visual or other evidence which is most effective for the task at hand. For example, when the attributes correspond to image objects, a user can actually look at the two images and make a determination of the level of similarity. Similarly, when the attributes correspond to text objects, the user can actually look at the two documents and make a determination of the level of similarity between the two. This level of similarity may be used in order to determine the effectiveness of the training process.

In order to specify the level of similarity between a pair of objects, the user can provide a value which represents the level of similarity that he feels exists in the presented pair, e.g., a value selected from a range of values from one to ten. Alternatively, the user can provide a discrete response which indicates whether or not the two objects are similar, e.g., a value of one if he feels the objects in the pair are similar, and a value of zero otherwise. It is to be understood that this specification of the user is made based on his perception of the level of similarity between the objects. This reaction is preferably encoded along with every object in the data set. However, depending on the nature of the data set, step 210 may be performed on only a portion of the data set.

In step 220, the server defines new objects in terms of the pairs of objects presented to the user. That is, features in the feature space of the data set of the server are redefined in terms of the object pairs presented to the user. For example, if the user is presented with the feature sets $X=(x(1) \ldots x(d))$ and $Y=(y(1) \ldots y(d))$, then the server defines a new object which is given by $(x(1)-y(1), x(2)-y(2), \ldots x(d)-y(d))$, wherein each feature element, $x(d)-y(d)$, of the new object is referred to as a feature variable. While this example shows the use of a distance or difference function defining the new object, in general, any arbitrary parametric function of the two objects may be returned as the new object.

In step 230, the server defines a class variable for each pair of objects based on the user reaction. That is, for each object pair, the server associates the user-provided similarity level value (provided in step 210) with the object pair. The user-provided similarity level value is thus considered the class variable for the pair.

In step 240, the server builds a model which relates the feature variables (determined in step 220) to the corresponding class variable (defined in step 230). This model may be built using well-known classification model-building techniques, for example, as are described in J. Gehrke et al., "BOAT: Optimistic Decision Tree Construction," ACM SIGMOD Conference Proceedings, pp. 169–180, 1999; M. Mehta et al., "SLIQ: A Fast Scalable Classifier for Data Mining," EDBT Conference, 1996; and J. Shafer et al., "SPRINT: A Scalable Parallel Classifier for Data Mining," VLDB Conference, 1996, the disclosures of which are incorporated by reference herein.

More specifically, the model provides a mathematical way of expressing the relationship between the class and the feature variables. It is to be understood that this model is constructed not for a single pair of objects but is created in accordance with a global analysis of the entire set of pairs of objects together with the user reactions. As mentioned, various conventional model building techniques may be employed to construct the model such as, for example, decision tree construction techniques.

In step 250, this model of similarity is then returned for storage at the server. The similarity function design process ends at block 260. Thus, advantageously, when a pair of objects is subsequently entered to the server without any user-provided indication of similarity, say for real-time evaluation, the similarity of the objects in the pair is automatically determined via the similarity model learned in accordance with the above-described user-interactive process. The similarity model therefore automatically outputs a similarity level value such as is described above, e.g., a value ranging from one to ten, a discrete value (one or zero), etc.

It is to be appreciated that those skilled in the art will realize that various alternative embodiments are also possible for determination of the similarity model for a data set. For example, one may choose to write the similarity function f( ) in some canonical form. An example of such a canonical form $f(X,Y)$ for the distance between the attributes $X=(x(1) \ldots x(d))$ and $Y=(y(1) \ldots y(d))$ is the function:

$$f(X, Y)=a(1)\cdot(x(1)-y(1))+ \ldots a(d)\cdot(x(d)-y(d))$$

Here $a(1) \ldots a(d)$ are the parameters of the canonical form which are determined from the different values of $f(X,Y)$ which are supplied by the user for individual pairs of records. The quality of the similarity function may be determined by the quality of the canonical form supplied and may be data dependent.

Figure 3:
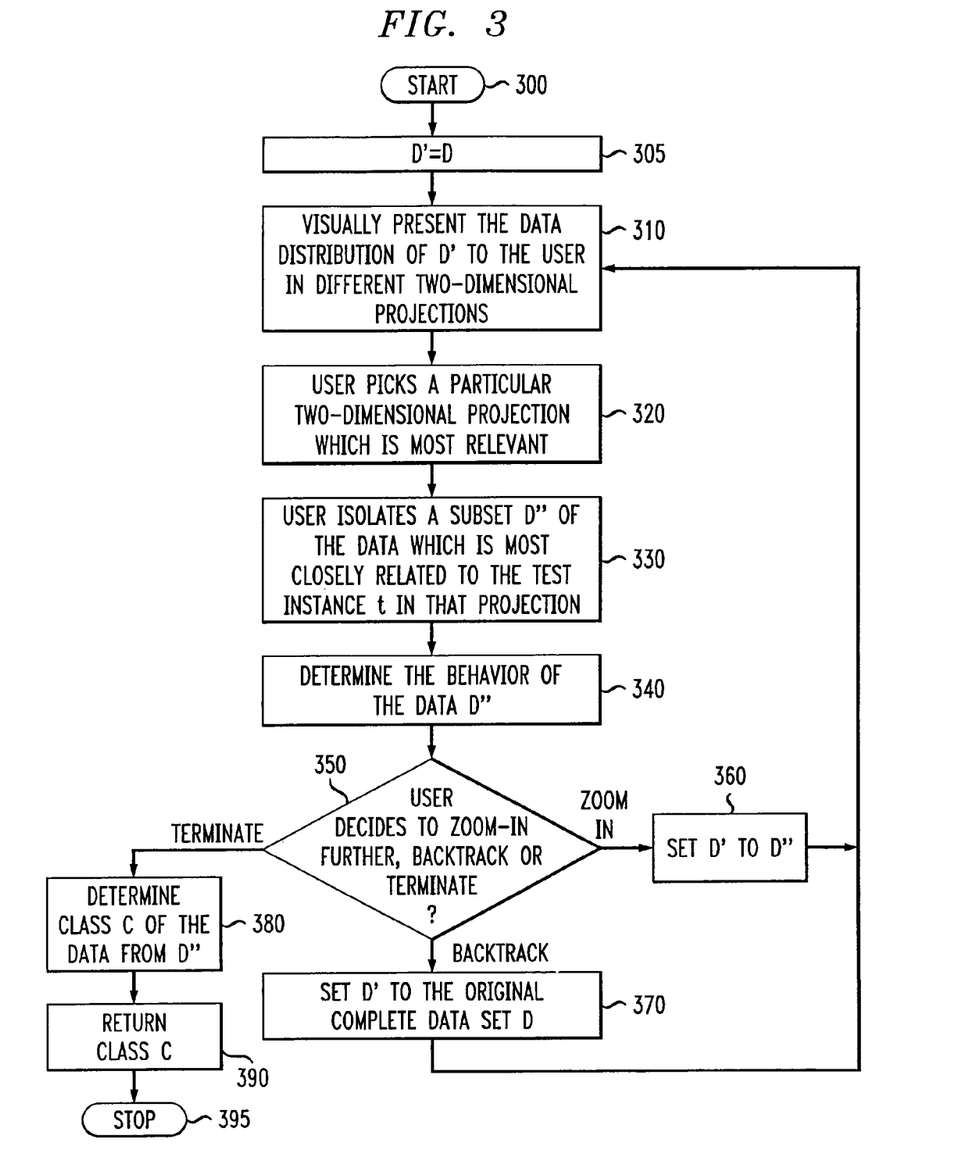
FIG. 3 is a flow diagram illustrating an overall process for classification in conjunction with user interaction according to an embodiment of the present invention.

Referring now to FIG. 3, a flow diagram illustrates an overall process for classification of a data set in conjunction with user interaction according to an embodiment of the present invention. As input to the process, it is assumed that a data set D with various classes, and a specific test instance are provided. The data set D and classes are preferably stored at the server 30 and a client at a client device 10 specifies the test instance. Each object in the data set D corresponds to a set of feature variables $(x(1) \ldots x(d))$ and a class variable. These feature variables are used to effectively determine the class of the test instance. Advantageously, in accordance with the invention, in addition to providing the test instance, the client at the client device assists in determining the classification or class labeling of the test instance through interaction with the server, as will be illustrated below.

The classification process begins at block 300. It is assumed that the user has specified the test instance t. In step 305, the server sets a data variable D' to the original data set D. Next, in step 310, the distribution of this data is visually presented to the user in different projections. The server computes the different projections and sends them to the client device for display to the user in accordance with the user interface provided to the user by the client device. It is to be understood that a projection or subspace is defined as a subset of the original set of dimensions. These different projections or subspaces of the data may be chosen either randomly at the server, or may be specified by the user. The distribution can be presented in various forms, for example, a two-dimensional scatter plot may be presented to the user. Such distribution and visual projection techniques are well known in the art. Also, it is to be understood that it is feasible that only one projection be presented to the user, although it is preferred that two or more projections be presented so that the user may have control over the selection. Further, dependent on the nature of the data being classified, a user may be provided with a textual representation of the data rather than a graphical representation. Of course, the invention contemplates representations being a combination of graphical and textual forms or, for that matter, any other suitable form of data representation.

In step 320, the user picks a particular two-dimensional projection which is most relevant to the specified test instance t. It is to be understood that when the user is described as performing an action in this process, the user does so in conjunction with the client device. For example, the act of selecting may be performed by the user clicking (with a mouse) on the desired projection presented on his display, or by making the choice known using some other input device associated with the client computer. Various criteria may be used in order to determine which two-dimensional projection is most relevant. For example, a user may decide to use that projection in which there is a greater concentration of a particular class around the test instance.

In step 330, the user isolates a subset of the data which is most closely related to the test instance t. For example, this region may correspond to data points which belong to the same class. This isolated data set is referred to as D". It is to be understood that isolation of a subset may be accomplished in accordance with a variety of well-known user/computer interface techniques, e.g., the user "rubberbanding" or "boxing in" a desired section of the displayed projection. As is known, "rubberbanding" or "boxing in" refers to the technique of drawing a shape around a portion of the projected data set that the user seeks to highlight or select.

Next, the behavior of the data set D" is determined to see if a particular class is in significantly higher concentration in the reduced data set D" than it is in the original complete data set D (and, therefore, in the remainder of the original complete data set D). This operation is done in step 340 and may be performed remotely by the server or, alternatively, locally by the client device (as may other steps when such local processing may be more efficient). In order to do so, the original complete data set D and the reduced data set D" are used. A detailed description of this process is provided below in the context of FIG. 4. In accordance with such behavior information, a user may make one of three choices in step 350, i.e., zoom-in further, backtrack, or terminate. If the user decides to zoom-in, then D' is set to D" in step 360 and the process returns to step 310 and is repeated. If the user decides to backtrack, then D' is set to the original complete data set D in step 370 and the process returns to step 310 and is repeated. Finally, if the user decides to terminate, then the class C of the data from D" is determined in step 380. A detailed description of this process will be provided below in the context of FIG. 5. Class C is returned as the class for the test instance t in step 390. The class labeling process ends at block 395.

Figure 4:
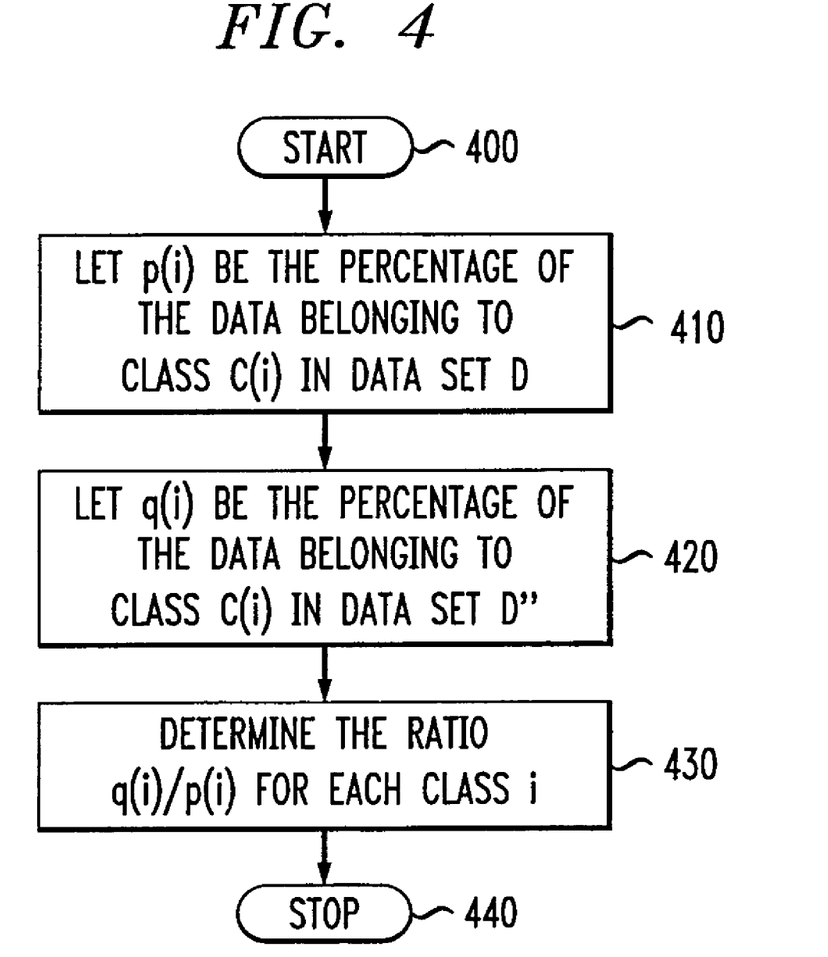
FIG. 4 is a flow diagram illustrating a process for determining behavior of a data set according to an embodiment of the present invention.

FIG. 4 is a flow diagram illustrating a process for determining behavior of a data set according to an embodiment of the present invention. The process shown in FIG. 4 illustrates a preferred technique for performing step 340 in the overall classification process of FIG. 3. The process begins at block 400. It is assumed that the input provided to this operation includes the original data set D, the reduced data set D", and the known classes $C(1) \ldots C(k)$. In step 410, the percentage of the data belonging to the class $C(i)$ in the data set D is computed. That is, $p(i)$ is computed as the percentage of the data belonging to the class $C(i)$ in the data set D. This step is repeated for each of the classes $1 \ldots k$. In step 420, $q(i)$ is computed as the percentage of the data belonging to the class $C(i)$ in the data set D". Again, the step is repeated for each of the classes $1 \ldots k$.

In step 430, the ratio distribution $q(i)/p(i)$ is computed for each of the classes $i(1 \ldots k)$. This ratio is referred to as the interest ratio for the class i. We note that this determination of the behavior of the data set helps the user determine whether or not he should terminate. If the ratio distributions for each class are even, then it is desirable not to terminate at that point. In such a case, a user may decide to backtrack. On the other hand, when the ratio distributions are significantly skewed, then a user may wish to zoom-in further. Finally, if one of the ratios is significantly larger than any of the others, then the user may decide to terminate. The process ends at block 440.

Figure 5:
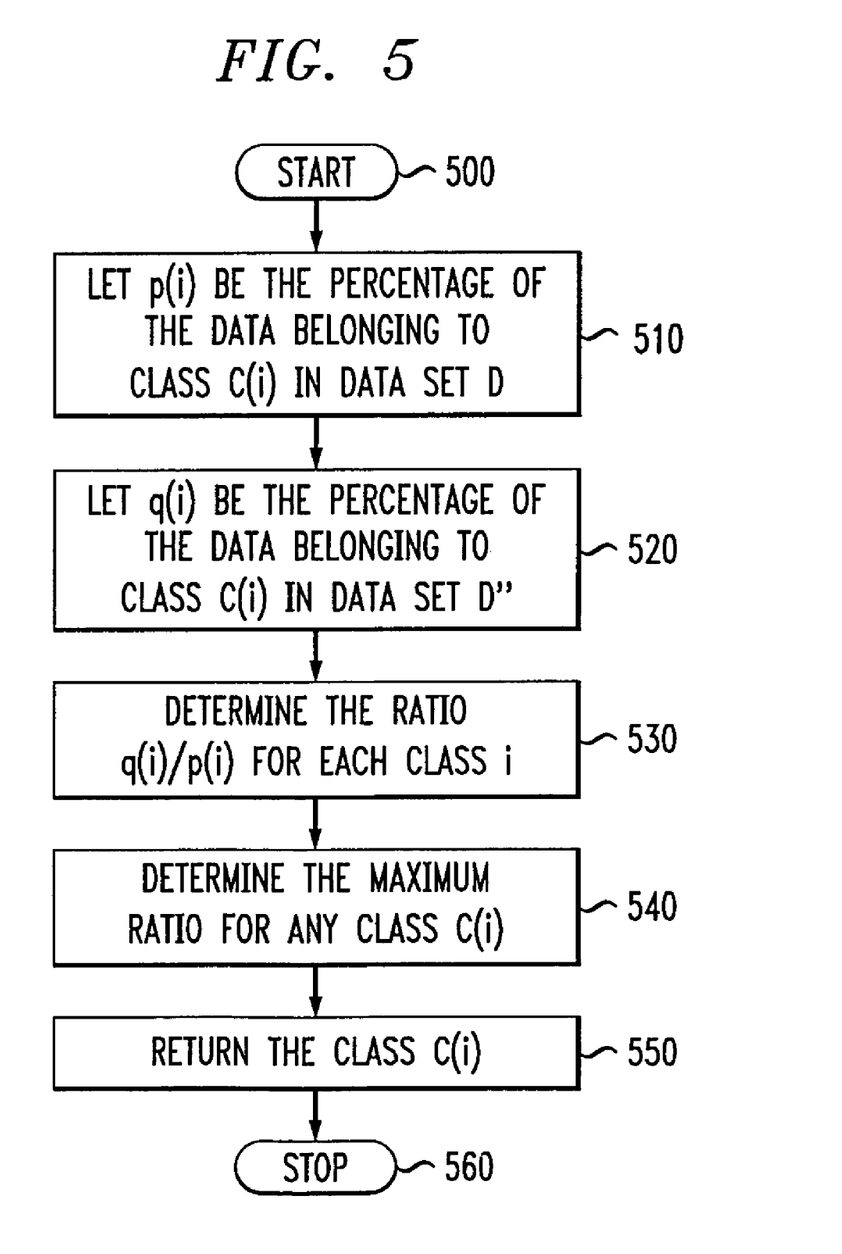
FIG. 5 is a flow diagram illustrating a process for determining a dominant class of a data set according to an embodiment of the present invention.

FIG. 5 is a flow diagram illustrating a process for determining a dominant class of a data set according to an embodiment of the present invention. The process shown in FIG. 5 illustrates a preferred technique for performing step 380 in the overall classification process of FIG. 3. The process begins at block 500. Similar to the process of FIG. 4, it is assumed that the input provided to the operation of FIG. 5 includes the original data set D, the reduced data set D", and the known classes $C(1) \ldots C(k)$.

As is evident, steps 510 through 530 are identical to those illustrated and described in the context of FIG. 4 and thus will not be explained again. Thus, at the end of step 530, the interest ratios of the different classes in the data set have been computed. These interest ratios are then used to make the final determination on the class identity of the test instance. In step 540, the maximum ratio for any class $C(i)$ is determined. This is accomplished by determining which interest ratio results in the highest value. This class $C(i)$ is returned in step 550 and is the response to the user query that requested the class label for the specified test instance. The process ends at block 560.

In accordance with the present invention, as has been described herein, techniques are provided for the use of human interaction in supervising the determination of various characteristics associated with high dimensional data. These techniques include the determination of similarity among different records as well as the supervision procedures in order to learn the relationships between the feature variables and the class variable. In addition, these techniques include a process for using human interaction for effective instance-based classification of high dimensional data. Such a class labeling methodology according to the invention provides a technique of decision path construction, in which the user is provided with the exploratory ability to construct a sequence of hierarchically chosen decision predicates, e.g., which projection to use, what portion of the selected projection to consider, whether to zoom-in, backtrack or terminate, etc. At a given node on the decision path, the user may be provided with a visual or textual representation of the data in a small number of sub-spaces.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-based method of computing a similarity function from a data set of objects, the method comprising the steps of:

obtaining a training set of objects;
    presenting a user with one or more subsets of objects based on the training set of objects, each subset comprising at least two objects of the data set;
    receiving user feedback regarding similarity between the one or more subsets of objects;
    defining one or more sets of feature variables based on features in the one or more subsets of objects;
    defining one or more class variables in accordance with the user feedback; and
    constructing a similarity function which relates the one or more sets of feature variables to the one or more class variables;
    wherein each of the sets of feature variables is defined by a pairwise subtraction of the features in the corresponding subset of objects.

2. The method of claim 1, wherein the one or more class variables are based on one or more similarity values returned by the user.

3. The method of claim 1, wherein each of the sets of feature variables is defined as a parametric function of the features in the corresponding subset of objects.

4. The method of claim 3, wherein one or more parameters of the function are determined in accordance with the user feedback.

5. A computer-based method of computing a similarity function from a data set of objects, the method comprising the steps of:

obtaining a training set of objects;
    presenting a user with one or more subsets of objects based on the training set of objects, each subset comprising at least two objects of the data set;
    receiving user feedback regarding similarity between the one or more subsets of objects;
    defining one or more sets of feature variables based on features in the one or more subsets of objects;
    defining one or more class variables in accordance with the user feedback; and
    constructing a similarity function which relates the one or more sets of feature variables to the one or more class variables;
    wherein the similarity function is constructed for subsequent use in automatically determining the similarity between two or more objects of substantially unknown similarity.

6. Apparatus for computing a similarity function from a data set of objects, the apparatus comprising:

at least one processor operative to: (i) obtain a training set of objects; (ii) present a user with one or more subsets of objects based on the training set of objects, each subset comprising at least two objects of the data set; (iii) receive user feedback regarding similarity between the one or more subsets of objects; (iv) define one or more sets of feature variables based on features in the one or more subsets of objects; (v) define one or more class variables in accordance with the user feedback; and (vi) construct a similarity function which relates the one or more sets of feature variables to the one or more class variables; and
    memory, operatively coupled to the at least one processor, for storing at least one of the data set of objects and the constructed similarity function;
    wherein each of the sets of feature variables is defined by a pairwise subtraction of the features in the corresponding subset of objects.

7. The apparatus of claim 6, wherein the one or more class variables are based on one or more similarity values returned by the user.

8. The apparatus of claim 6, wherein each of the sets of feature variables is defined as a parametric function of the features in the corresponding subset of objects.

9. The apparatus of claim 8, wherein one or more parameters of the function are determined in accordance with the user feedback.

10. Apparatus for computing a similarity function from a data set of objects, the apparatus comprising:

at least one processor operative to: (i) obtain a training set of objects: (ii) present a user with one or more subsets of objects based on the training set of objects, each subset comprising at least two objects of the data set; (iii) receive user feedback regarding similarity between the one or more subsets of objects; (iv) define one or more sets of feature variables based on features in the one or more subsets of objects; (v) define one or more class variables in accordance with the user feedback; and (vi) construct a similarity function which relates the one or more sets of feature variables to the one or more class variables; and
    memory, operatively coupled to the at least one processor, for storing at least one of the data set of objects and the constructed similarity function;
    wherein the similarity function is constructed for subsequent use in automatically determining the similarity between two or more objects of substantially unknown similarity.

11. An article of manufacture for computing a similarity function from a data set of objects, the article comprising a machine readable medium containing one or more programs which when executed implement the steps of:

obtaining a training set of objects;
    presenting a user with one or more subsets of objects based on the training set of objects, each subset comprising at least two objects of the data set;
    receiving user feedback regarding similarity between the one or more subsets of objects;
    defining one or more sets of feature variables based on features in the one or more subsets of objects;
    defining one or more class variables in accordance with the user feedback; and
    constructing a similarity function which relates the one or more sets of feature variables to the one or more class variables;
    wherein each of the sets of feature variables is defined by a pairwise subtraction of the features in the corresponding subset of objects.

12. The article of claim 11, wherein the one or more class variables are based on one or more similarity values returned by the user.

13. The article of claim 11, wherein each of the sets of feature variables is defined as a parametric function of the features in the corresponding subset of objects.

14. The article of claim 13, wherein one or more parameters of the function are determined in accordance with the user feedback.

15. An article of manufacture for computing a similarity function from a data set of objects, the article comprising a machine readable medium containing one or more programs which when executed implement the steps of:

obtaining a training set of objects;

presenting a user with one or more subsets of objects based on the training set of objects, each subset comprising at least two objects of the data set;

receiving user feedback regarding similarity between the one or more subsets of objects;

defining one or more sets of feature variables based on features in the one or more subsets of objects;

defining one or more class variables in accordance with the user feedback; and constructing a similarity function which relates the one or more sets of feature variables to the one or more class variables;

wherein the similarity function is constructed for subsequent use in automatically determining the similarity between two or more objects of substantially unknown similarity.

* * * * *